Patented Apr. 9, 1946

2,398,181

UNITED STATES PATENT OFFICE 2,398,181

FLUORO-CHLORO-BUTANES

Frank Willard Johnson, Wilmington, Del., assignor to E. I. du Pont de Nemours & Company, Wilmington, Del., a corporation of Delaware No Drawing. Application July 8, 1942, Serial No. 450,185

3 Claims. (Cl. 260—653)

This invention relates to halogenated hydrocarbons and more particularly it relates to compounds of the formula $CH_3$—$CXF$—$CHCl$—$CH_3$, wherein X is fluorine or chlorine.

Ever since the discovery of chloroprene and the discovery that polymerized chloroprene is a rubber-like material, considerable interest has been shown in the possibility of making rubber-like materials by polymerizing fluoroprene (2-fluoro-1,3-butadiene), (see U. S. Patent No. 2,012,223). Many proposed processes for the making of this fluoro compound have been suggested and tried without the discovery of a satisfactory method for its preparation.

It is an object of this invention to prepare an intermediate for the making of fluoroprene. Another object is to discover a fluorinated organic compound having four carbon atoms which would be a suitable intermediate for the making of fluoroprene. Another object is to prepare fluoro-chloro-butanes. Other objects will appear hereinafter.

These objects have been accomplished by the preparation of 2-fluoro-2,3-dichloro-butane and 2,2-difluoro-3-chloro-butane. These compounds can be prepared by treatment of 2,2,3-trichloro-butane, which is a known compound, with suitable fluorinating agents; such, for example, as antimony trifluoride or hydrogen fluoride in the presence of mercuric oxide.

In order that the invention may be more fully understood the following examples are given by way of illustration, parts being given by weight.

Example I

Eighty-five parts of $SbF_3$ was added to seventy-seven parts of 2,2,3-trichloro-butane and the mixture heated in an oil bath under reflux. The mixture was shaken frequently during reaction. The mixture started to reflux at 142° C. and the boiling point gradually dropped, and after three hours the product was refluxing at 108° C., vapor temperature. The product was distilled out, washed twice with 6NHCl, then with water and dried over $Na_2SO_4$. The product was then fractionally distilled. The principal product obtained was 2-fluoro-2,3-dichloro-butane. A small amount of 2,2-difluoro-3-chloro-butane was also obtained.

Example II

One hundred eighty-five parts of 2,2,3-trichloro-butane was placed in a stainless steel pot with four hundred forty-two parts of HgO and heated to 100° C. during the addition of fifty parts of anhydrous HF. This process required five hours. The reaction products were distilled out under vacuum and the products trapped in receivers, cooled in carbon ice and acetone bath, backed by a liquid nitrogen trap. The distillation was carried out at about 150° C. About one hundred parts of organic material was recovered. The reaction products were then washed with water, dried, and fractionally distilled. The principal product was 2,2-difluoro-3-chloro-butane and a smaller amount of 2-fluoro-2,3-dichloro-butane was also formed by the reaction.

Example III

Six hundred and forty-four parts of 2,2,3-trichloro-butane was placed in a nickel pot with 447 parts of HgO and heated to 60° C. 95 parts of anhydrous HF were introduced with stirring over a period of about three hours, keeping the temperature at 50–70° C. The reaction products were steam-distilled, washed with 10% $NaHSO_3$ solution, followed by 5% $Na_2CO_3$ and water, and fractionally distilled. About 17 parts of 2,2-difluoro-3-chloro-butane, 133 parts of 2-fluoro-2,3-dichloro-butane and 285 parts of unchanged 2,2,3-trichloro-butane were recovered.

2-fluoro-2,3-dichloro-butane is a liquid having a boiling point of 106–109° C. at atmospheric pressure with a specific gravity at 25° C. of 1.197 and a refractive index $n_D^{20}$ 1.417. The 2,2-difluoro-3-chloro-butane is a colorless liquid with a boiling point of 72–73° C. at atmospheric pressure with a specific gravity at 25° C. of 1.128 and a refractive index $n_D^{20}$ 1.363.

The new compound, 2-fluoro-2,3-dichloro-butane, is a valuable intermediate for the preparation of fluoroprene by the removal of two moles of HCl. Both new compounds are intermediates used to produce more highly fluorinated derivatives of butane.

It will be readily apparent to those skilled in the art that the invention is not limited to the specific process limitations set forth in the examples but that suitable changes may be made in temperature, pressure, and other reaction conditions without departing from the invention.

I claim:

1. A compound of the formula $$CH_3-CXF-CHCl-CH_3$$

wherein X is a member of the group consisting of chlorine and fluorine.

2. 2-fluoro-2,3-dichloro-butane.

3. 2,2-difluoro-3-chloro-butane.

FRANK WILLARD JOHNSON.